(12) United States Patent
Bannert et al.

(10) Patent No.: US 6,202,957 B1
(45) Date of Patent: Mar. 20, 2001

(54) ARRANGEMENT FOR THE ROLLING UP OF A BELT BAND

(75) Inventors: Georg Bannert, Ummendorf; Andreas Wengert, Mutlangen; Roland Schnabl, Ulm; Hermann Hasse, Lonsee; Thomas Kempfle, Bibertal; Robert Kopetzky, Lonsee, all of (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/215,248

(22) Filed: Dec. 18, 1998

(30) Foreign Application Priority Data

Dec. 22, 1997 (DE) .................................. 197 57 373

(51) Int. Cl.⁷ .......................... B60R 22/34; B65H 75/28
(52) U.S. Cl. .................... 242/587.1; 242/376; 242/613.4
(58) Field of Search ................................ 242/379.1, 376, 242/587.1, 584.1, 586.2, 613.4

(56) References Cited

U.S. PATENT DOCUMENTS 4,967,976 * 11/1990 Kawai et al. ..................... 242/376
5,452,863 * 9/1995 Hardy .............................. 242/376
5,630,561 * 5/1997 Ogawa et al. ................... 242/379.1
5,722,611 * 3/1998 Schmid et al. .................. 242/379.1

FOREIGN PATENT DOCUMENTS

| 21 63 788 | 7/1973 | (DE) . |
| 27 04 084 | 8/1977 | (DE) . |
| 28 50 744 | 5/1979 | (DE) . |
| 34 40 698 | 5/1986 | (DE) . |
| 36 14 283 | 10/1987 | (DE) . |
| 36 24 155 | 2/1988 | (DE) . |
| 0 252 834 | 1/1988 | (EP) . |
| 0 562 423 | 9/1993 | (EP) . |

* cited by examiner

Primary Examiner—John M. Jillions
(74) Attorney, Agent, or Firm—Foley & Lardner

(57) ABSTRACT

The invention relates to an arrangement for the rolling up of a belt band (30) comprising a reel (1) which has at its jacket surface (2) an axial cut-out (4) extending parallel to the reel axis, comprising a belt band (30) secured to the reel (1) and comprising a reinforcement element (20) which is arranged at the reel (1) and which bridges the axial cut-out (4).

17 Claims, 4 Drawing Sheets

Figure 1A:
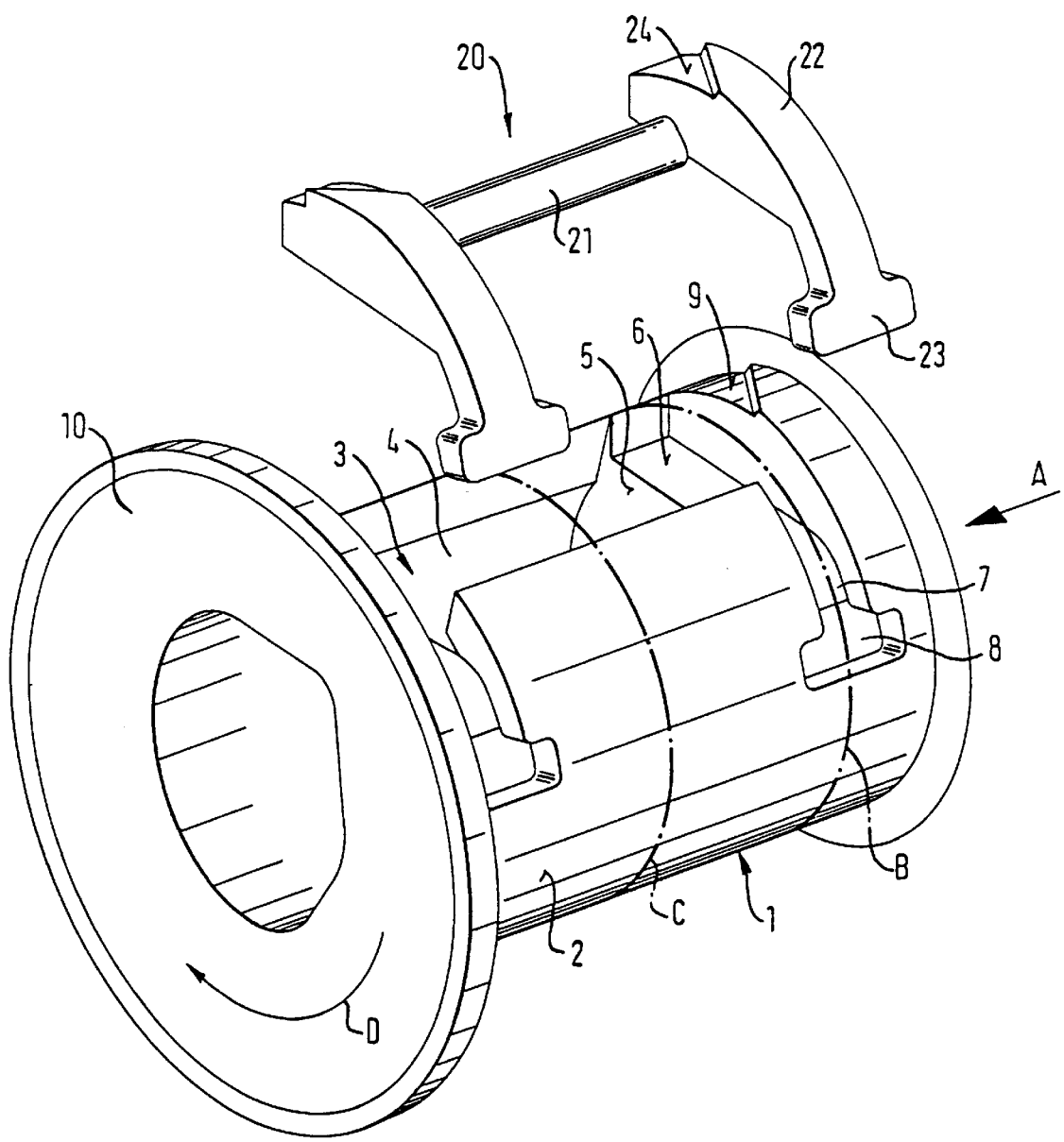

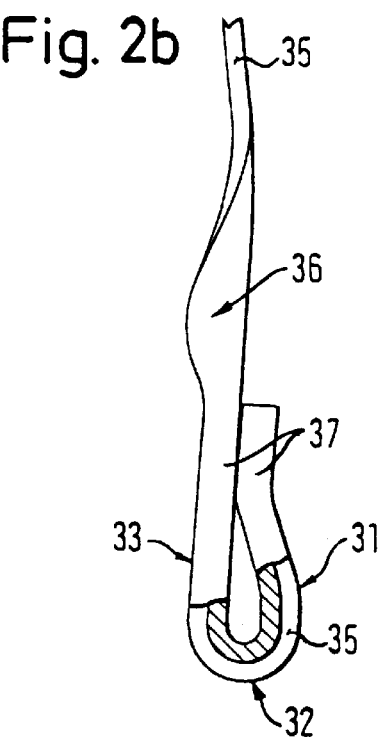
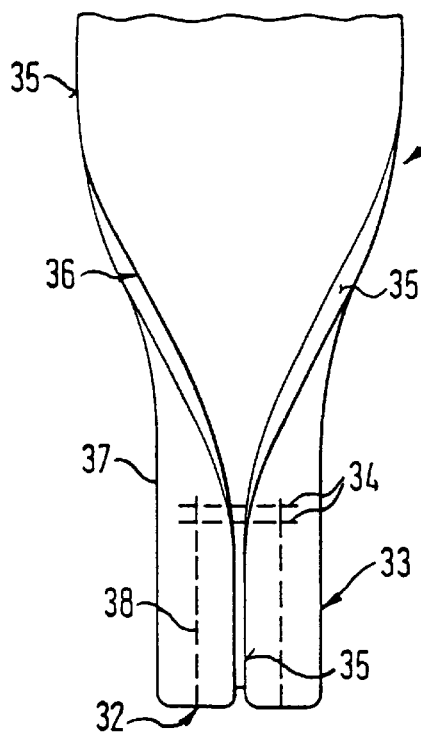
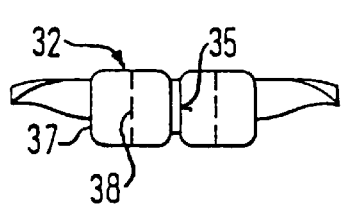
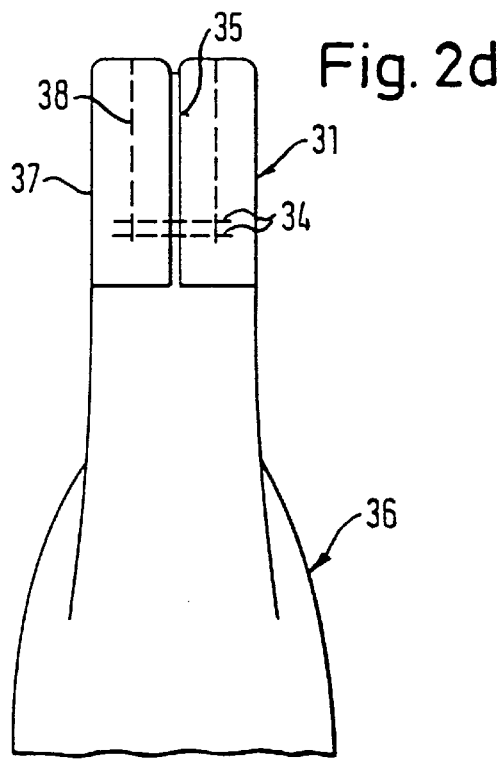

ARRANGEMENT FOR THE ROLLING UP OF A BELT BAND

The invention relates to an arrangement for the rolling up of a belt band comprising an in particular cylindrically formed reel which has an axial cut-out extending parallel to the reel axle at its jacket surface, and a belt band fastened to the reel.

In arrangements of this kind the reel serves for the rolling up of the belt band along its jacket surface. For this the reel is induced to a rotational movement about its longitudinal axis by a suitable apparatus. A belt up-roller with a belt reel of which the hollow cylindrical jacket has a slit for the passage of a belt band to be wound up on the belt reel is known from the European patent specification 0 562 423 B1. The end of the belt band forms a loop which is pushed onto a torsion bar which extends coaxially to the belt reel through a hollow cylindrical inner space of the reel jacket.

A problem with known arrangements is their limited mechanical stability, in particular the stability of the reels along the edges of their axial cut-out in the event of an abrupt or permanent tensional stress acting tangentially to the jacket surface at the belt band, which is fastened in particular in the interior of the reel.

It is an object of the invention to improve the embodiment of the constituents of the arrangement and their cooperation in such a manner that their stability and permanent reliability is increased in simple manufacture and assembly.

This object is satisfied by a reinforcement element which is arranged at the reel and which bridges over the axial cut-out.

The reinforcement element is thus executed in such a manner that it substantially produces an additional mechanical connection between two oppositely disposed sides of the axial cut-out of the reel, in particular between two sides which are disposed opposite to one another in the wind-up or rotational direction of the reel respectively. For this it can be secured to the reel in the region of the cut-out or be a part of the reel.

Through the embodiment of the arrangement with the reinforcement element in accordance with the invention it is thus possible to transmit forces acting on one edge region of the cut-out at least partly to the respective opposite edge region of the cut-out via the reinforcement element. Transverse forces acting at the cut-out can thus be taken up by a wide region of the reel so that a lessening of the stability of the reel effected by the formation of the cut-out in it can be substantially compensated.

Through the bridging of the axial cut-out the mechanical stability of the reel is increased in the region of the cut-out in particular with respect to forces acting tangentially at the edge region of the cut-out. A breaking or tearing apart of the reel in the region of the cut-out can thereby be more effectively prevented; the reliability of the arrangement is increased.

Advantageous embodiments of the invention are described in the description, in the drawings and in the subordinate claims.

In favour of an advantageously simple assembly the securing of the reinforcement element to the reel is preferably done by hooking in. In this it is possible to transmit the force provided for the rotational drive of the reel for the rolling up of the belt band to the reinforcement element so that the hooked-in reinforcement element thereby remains fixed. In addition the belt band which is wound up on the reel can lie in contact with the hooked-in reinforcement element in such a manner that it fixes its mounting at the reel.

Alternatively to this it is possible to latch or otherwise permanently secure the reinforcement element at the reel so that no additionally acting fixing mechanism need be provided.

The handling of the arrangement in accordance with the invention during assembly is particularly simple if the reinforcement element is formed as a separate component. In an embodiment in which the reinforcement element covers over a part of the axial cut-out in particular it can be advantageous to arrange the separate reinforcement element at the reel only at an advanced assembly state of the arrangement.

Furthermore, it is advantageous if the reinforcement element is sunk at least partly in the reel when it is being secured to the latter. Through a form-fitted embodiment of the reinforcement element and the reel of this kind, namely, an at least substantially cylindrical form of the jacket surface of the reel can be obtained, through which the winding up of the belt band along this jacket surface is facilitated. Through the sunken arrangement of the reinforcement element inside the reel and through the additional lying on of the belt band at this arrangement, a particularly effective force lock between the reinforcement element and the reel is possible so that the stability of the reel is increased even further.

In a preferred embodiment the belt band is secured to the reinforcement element. In this case the belt band is secured to the reel via the reinforcement element. It is thereby possible to transmit a force to the reinforcement element via the belt band which, on the one hand, acts counter to a hook-in mechanism, through which the reinforcement element is secured to the reel. On the other hand, the force which is transmitted via the secured belt band to the reinforcement element can be transferred to the reel and in particular to the edge region of its axial cut-out and thus exploited for a stabilisation of the arrangement. The reinforcement element can thus counteract a draw effect of the belt band fastened to it through its securing at the reel while developing a stabilising action.

In this embodiment it is preferred that the reinforcement element is secured to the jacket surface from the outside since the assembly of the arrangement is thereby simplified. It is however also possible to secure the reinforcement element in the region of the axial cut-out from a cavity inside the reel and to lead the belt band, which is secured to the reinforcement element, outwards through the axial cut-out out of the reel.

In the arrangement in accordance with the invention and in particular in the securing of the reinforcement element, which is connected to the belt band, to the outer side of the reel, it is advantageous to lead the belt band in the direction of an axial cavity of the reel and to lead it there at least about a part of the peripheral surface of a shaft which is arranged inside the reel cavity coaxial to the reel axis. In this the shaft can at the same time serve for the transmission of a rotational movement or a torque required for the latter respectively to the reel for the rolling up of the belt band along the jacket surface of the reel, as well as for the deflection of the belt band and thus of the force transmitted via the belt band inside the reel cavity. The belt band, which is at least partly led along the peripheral surface of the shaft, can leave the reel cavity through the axial cut-out of the reel.

The securing of the belt band at the reinforcement element is preferably done via a closed loop at one end of the belt band which surrounds a part of the reinforcement element. A particularly favourable constructional embodiment of the arrangement in accordance with the invention is present when the reinforcement element has a securing pin extending transversely to the belt band direction, and holding means for securing the securing pin at a reception region of the reel, and when the reel has a receiving means at the reception region in which the holding means can be secured for the assembly of the arrangement or for the securing of the reinforcement element respectively.

The holding means preferably extends transversely over the axial cut-out of the reel in particular in a plane perpendicular to the reel axle so that the securing pin and the holding means are arranged at mutually opposite sides of the axial cut-out. Through this a particularly effective increase in the stability of the reel with respect to transverse forces acting at the axial cut-out can be achieved.

In this the arrangement is formed in such a manner that the holding means and the securing pin in each case counteract mutually oppositely directed forces which are exerted substantially tangentially at the jacket surface of the reel. The belt band can in particular be secured at the securing pin and thus transmit draw forces to the reinforcement element which are counteracted by the securing of the holding means at the reception part at the reel.

The holding means of the reinforcement element preferably has at least one holder arm of elongate form which can be arranged at a longitudinal end of the securing pin substantially at right angles to the latter. The holder arm overlaps the axial cut-out of the reel and is in this at least region-wise curved. In particular in that embodiment of the invention in which the reinforcement element is secured sunken in the reel, the curvature of the outer surface of the holder arm corresponds to the radius of the associated cross-section of the reel.

A holder arm is in each case preferably formed on or fastened to each of the two longitudinal ends of the securing pin. In this case the two holder arms can extend at the two longitudinal ends of the axial cut-out over the latter so that a symmetrical force distribution can result for the stabilisation of the reel in the region of its cut-out.

In order to enable a securing of a holder arm at the reel, a hooking-in means can be formed at its end which is to be secured in an associated reception means at the reel. The hooking-in means is preferably hooked in at the reel; and it is formed as a T-shaped anchor. The two barbs of this anchor can be formed on at the holder arm substantially perpendicular to the longitudinal form of a holder arm and parallel to the reel axis. In this case the associated reception means is formed at the reel as a corresponding recess in which the barbs can be sunk with the holder arm.

It is however also possible to form the hooking-in means at a holder arm as a hook which is introduced into a corresponding recess in the reel and which in particular points in the direction towards the reel axis. Alternatively or additionally, the hooking-in means can be formed as a counter-pin which extends parallel to the reel axis and which is arranged at an end of the holder arm or arms facing away from the securing pin.

In an advantageous embodiment of the arrangement the latter has an elongate counter-holding pin which is arranged inside the jacket surface of the reel, in particular inside the above named axial cavity, and indeed parallel to the reel axis and substantially oppositely disposed to the named axial cut-out of the reel with respect to the reel axis. The counter-holding pin serves for the reception of the force which is required for a deflection of the belt band, which is guided inside the axial cavity.

The belt band can thus be guided in this embodiment in the direction towards an axial cavity and there around a shaft which is arranged coaxial to the reel axis, with it being possible for it to extend along parts of the peripheral surface of the shaft. Since however the actual deflection of the belt band inside the reel is done about the correspondingly arranged counter-holding pin, the latter takes up the counter-force required for the deflection so that the shaft is substantially stressed only by the torque required for the rotational movement of the reel, but not however by the named counter-force. The belt band lies areally in contact with the counter-holding pin in this case.

The jacket surface of the reel can have an axial opening which is connected to the axial cut-out of the jacket surface via the axial cavity, with it being in particular disposed opposite to the axial cut-out with respect to the reel axis. The axial opening can thus extend the axial cavity radially in order to enable or facilitate the arrangement of the counter-holding pin with the thereon lying belt band inside the jacket surface of the reel. Furthermore, the axial opening can simplify the assembly of the arrangement, in particular the installation of the counter-holding pin.

In particular when the axial opening is substantially oppositely disposed to the axial cut-out it does not necessarily effect a lesser mechanical stability of the arrangement since draw forces which are transmitted tangentially via the belt band to the jacket surface of the reel act at the edge of the axial cut-out and can thus be transmitted outwardly along a wide part of the jacket surface periphery, for example to external limiting discs.

The counter-holding pin can either be formed as a separate component or it can be formed on in each case with at least one of its two longitudinal ends at another part of the reel, in particular at one or two limiting walls or limiting discs which limit the jacket surface of the reel in the direction parallel to the reel axis.

In the case that at least one longitudinal end of the counter-holding pin is free, i.e., is not formed on at another part of the arrangement, it is advantageous if a contact surface is provided for each free longitudinal end which supports the counter-holding pin when the latter is stressed by a force. A contact surface of this kind can have lateral limiting walls for the additional lateral stabilisation, and it can be formed out at the named limiting discs or at the jacket surface of the reel, for example as a depression or a step offset, corresponding to the previously explained cooperation of the receiving means of the reel and of the holding means of the reinforcement element.

It is possible to dimension the extent of the axial cut-out or of the axial opening to be smaller parallel to the reel axis than the width of the belt band to be rolled up along the jacket surface of the reel. In a lesser axial extension there advantageously results an even greater stability of the reel. For this the belt band is to be formed in such a manner that at least the belt band region which passes through the axial cut-out or passes the axial opening respectively has a correspondingly reduced width. Along the belt band region which is adjacent to the named belt band region of reduced width and which is to be rolled up along the jacket surface of the reel the belt band can again have its normal width. A possible embodiment of the belt band of this kind is described in the following:

The invention also extends to a belt band which is folded over region-wise along a longitudinal direction to form at least one longitudinal fold, with a first part of this region of the longitudinal fold being folded back in the direction towards a second part of this region at a transverse fold extending in particular perpendicularly to the longitudinal direction, and with the first part of the longitudinal fold region being secured to the second part in such a manner that a closed loop is formed. The securing of the two parts to one another is preferably done by sewing, and indeed in the direction perpendicular to the direction of the belt band. The loop thus formed can, for the securing of one end of the belt band to an apparatus, encircle the latter or a part thereof.

Along the longitudinal fold the belt band consequently has a lessened width, through which the apparatus at which the loop which is formed by the belt band is to be hung in can be advantageously formed more compactly and thus more stably. In the arrangement in accordance with the invention the belt band thus additionally contributes to the satisfying of the object of the invention.

Beyond the loop formed along the longitudinal fold and the securing of the two parts of the longitudinal fold region, the belt band widens again to normal width in that the folded over part of the longitudinal fold, starting at the securing location, transforms continuously or at a further fold from a folded over cross-section into a straight-line cross-section.

Through the described embodiment of the belt band, not only is a lessened width of the belt band possible in the region of the longitudinal fold or of the loop respectively, but favourable force distributions can also be achieved between the belt band and the loop so that the danger of a breaking open or tearing open of the securing of the two parts of the longitudinal fold region is reduced. Thus, through the use of a belt band of this kind in the arrangement in accordance with the invention, the reliability and security of the latter can be yet further increased.

In order to lend the belt band loop which is formed additional stability, the two sections of the belt band which are in each case demarcated from one another by a longitudinal fold, can be secured to one another at least regionwise. For example it is possible to sew the sections to one another in the longitudinal direction of the belt band.

In the use of the belt band in the arrangement in accordance with the invention it is preferred to fold over both longitudinal edges of the belt band in the direction towards the middle of the belt band along a common longitudinal fold region to form a longitudinal fold in each case so that the two longitudinal edges are arranged adjacent to one another as well as to the middle of the belt band. Through this the width of the belt band is reduced to about one half of its original value, with a symmetrical and most largely homogenous force distribution along the belt band in the direction towards the loop continuing to be given.

In the use of the belt band in the arrangement in accordance with the invention it is also preferred to fold back the first part of the longitudinal fold region in the direction of the second part and to fasten it to the latter in such a manner that the two longitudinal edges of the belt band which are adjacent to one another and to the middle of the belt band extend along the outer side of the loop formed. In one embodiment of the arrangement in accordance with the invention the part of the longitudinal fold region forming the belt band end can thereby come to lie at the side of the belt band facing away from a shaft inside the reel, whereas the other part of the longitudinal fold region and the belt band adjoining thereto can advantageously come to lie substantially flat in contact with the shaft.

In case the region in which the belt band transforms from a width reduced through the longitudinal fold to the normal width extends along at least a part of the jacket surface of the reel and the folded over longitudinal edge or edges of the belt band herein lie directly in contact on the jacket surface, the reel preferably has a recess at its jacket surface, the extent and depth of which in each case correspond to the longitudinal fold of the belt band. Through the recess associated with a folded over longitudinal edge it is ensured that the belt band can come to lie flat on the jacket surface of the reel at least with its outer side so that belt band layers which arise through rolling up of the belt band along the jacket surface and are arranged one above the other likewise come to lie flat on one another. A faultless rolling on and off of the belt band at the reel is thereby ensured.

Whereas the above described advantages of the novel embodiment of the belt band were described in connection with the arrangement in accordance with the invention, they can also be transferred to the forming of a belt band loop for other uses. In particular the more compact construction of an apparatus associated with the belt band which can be achieved through a reduced belt band width and the increased stability of the belt band in accordance with the invention also prove advantageous in the securing of the belt band at fixed suspension points, in particular in the securing of safety or holding belts in motor vehicles. In addition it is possible to form a loop in the described manner in accordance with the invention not only at one end of a belt band, but also in a central region.

Figure 1B:
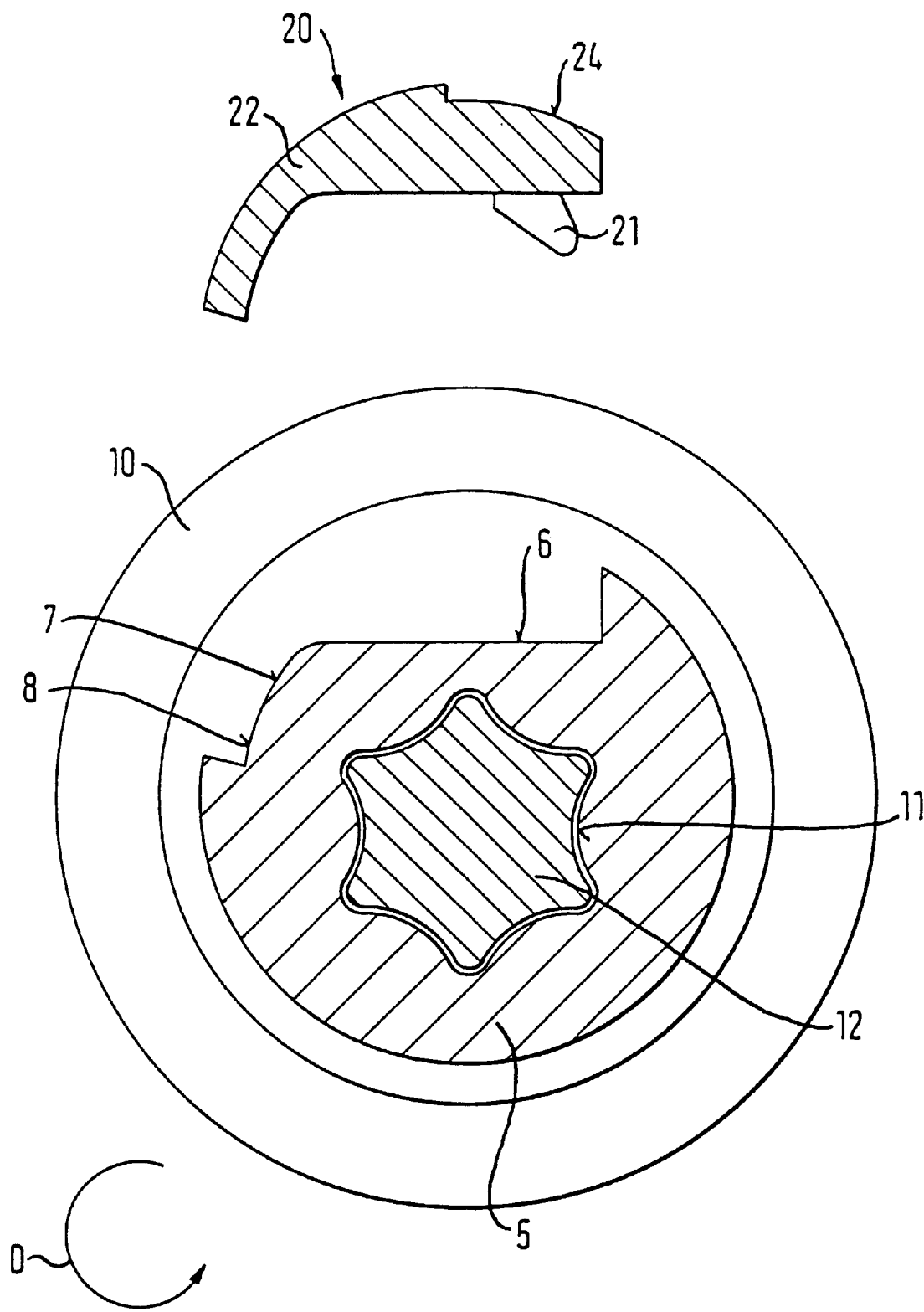
Figure 1C:
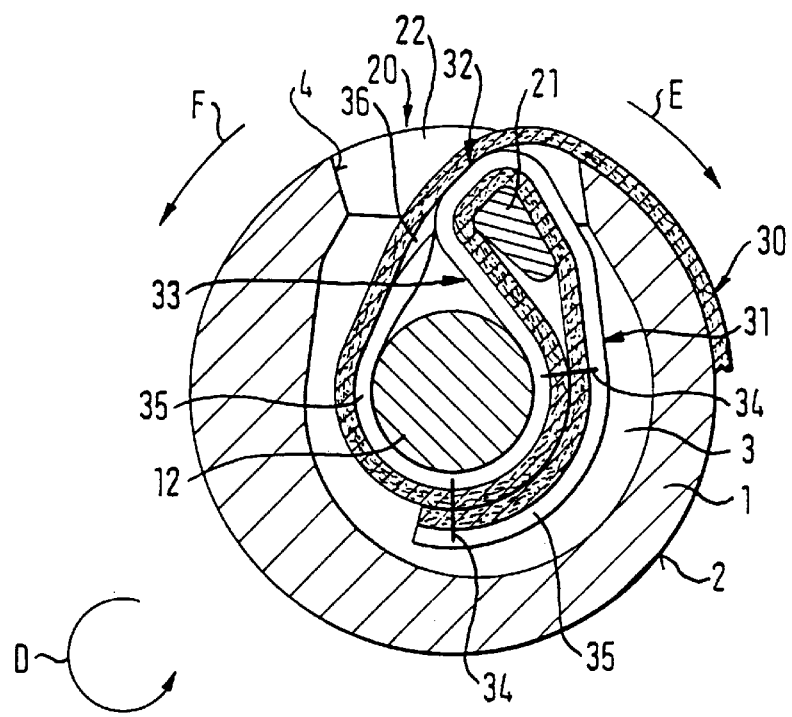
Figure 1D:
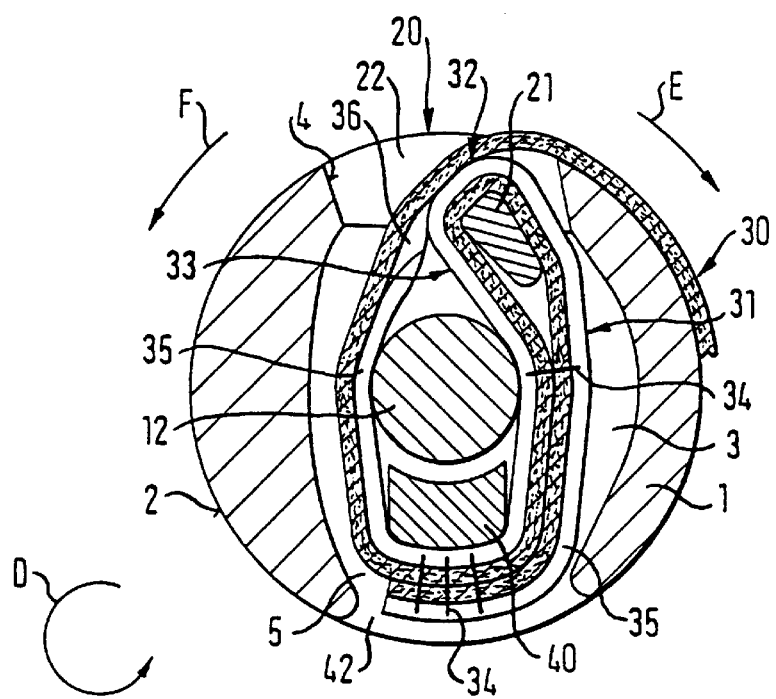

The invention will be explained in the following with reference to exemplary embodiments and with reference to the drawings, in which are shown:

FIG. 1a a schematic perspective view of a reel and of an associated reinforcement element of an arrangement in accordance with the invention;

FIG. 1b a first schematic cross-sectional view of the reel and of the reinforcement element along the plane B in accordance with FIG. 1a in the direction A, FIG. 1c a second schematic cross-sectional view of the reel along the plane C in accordance with FIG. 1a in the direction A with the reinforcement element hooked in and the belt band secured, and FIG. 1d a schematic cross-sectional view of another reel in accordance with the invention corresponding to the illustration of FIG. 1c, with the reinforcement element hooked in, the belt band secured thereto and with a counter-holding pin, and FIGS. 2a–2d different schematic views of a belt band in accordance with the invention for use with the reel and the reinforcement element in accordance with FIG. 1a.

FIG. 1a shows a reel 1 in a schematic perspective view. It has the basic form of a cylinder with a jacket surface 2. An axial cavity 3 of the reel 1 is open to the outside via an axial cut-out 4 at the jacket surface 2. The cavity 3 is limited in the axial direction in each case by an inner limiting wall 5. The distance of the two limiting walls 5 amounts to approximately half the axial extent of the jacket surface 2.

The cut-out 4 extends in the axial direction along the corresponding extent of the cavity 3 and beyond it along the depth of the respective limiting wall 5 so that a section of the jacket surface of the inner limiting wall 5, which is radially set back relative to the jacket surface 2 of the reel 1, lies free as a region-wise planar contact surface 6. The contact surface 6 extends in a tangential direction as a depression 7 of the jacket surface 2 of the reel 1, and it opens into a T-shaped depression 8.

Between each axial end of the cut-out 4 and the associated end face of the reel 1 the jacket surface 2 of the reel 1 has a depression 9 for the reception of a belt band which extends at an inclination with respect to the axial and the tangential direction. The depth of an inclined depression 9 is substantially less than that of the depressions 7, 8 departing from the contact surface 6.

A limiting disc 10 of a diameter greater than that of the jacket surface 2 is formed on at each end side of the reel 1.

A reinforcement element 20 is shown above the reel 1 in FIG. 1a. It has a securing pin 21 extending parallel to the longitudinal axis of the reel 1, at both longitudinal ends of which a holder arm 22 is formed on in each case. The holder arms 22 extend substantially in a plane perpendicular to the orientation of the securing pin 21. At their end facing away from the securing pin 21 the holder arms 22 each have a T-shaped anchor 23, the barbs of which are formed on the holder arm 22 and extend parallel to the orientation of the securing pin 21.

The outline of a holder arm 22 corresponds to the outline of the depressions 7, 8 in the jacket surface 2 of the reel 1. Each holder arm 22 is curved in such a manner that its lower side can come to lie in a form fitted manner on the contact surface 6 of the limiting wall 5 or on the depressions 7, 8 of the jacket surface 2 respectively, and that its upper side closes off flush with the jacket surface 2 of the reel 1 when the holder arm 22 is inserted in the depressions 7, 8. In this a depression 24 which extends at an inclination and which is associated with the inclined depression 9 at the jacket surface 2 is provided at the upper side of the holder arm 22.

FIG. 1b schematically shows a view in the direction A of the cross-section of the arrangement in accordance with FIG. 1a along the plane B which extends through the inner limiting wall 5.

In the cross-section of the limiting wall 5 the depression which is formed by the axial cut-out 4 and is limited by the contact surface 6 as well as the thereto adjoining depressions 7, 8 of the otherwise round outline can be recognised. In its centre the limiting wall 5 has a star-shaped cut-out 11 which extends in the axial direction and within which a shaft 12, which is likewise star-shaped and is arranged coaxially to the reel axis, is located in a form-fittedly toothed manner.

In the cross-section of the reinforcement element 20, which is likewise illustrated in FIG. 1b, the curved form of the holder arm 22 can be recognised. Furthermore, the securing pin 21 which is formed thereon, and which has an outline which is substantially in the shape of a triangle with rounded corners, is illustrated.

For the assembly of the arrangement in accordance with the invention it is provided to secure the reinforcement element 20 to the reel 1. For this the T-shaped anchors 23 of the holder arms 22 are hooked into the associated depressions 8, and the securing pin 21 is tilted in the direction towards the reel 1 in such a manner that the lower side of the holder arms 22 come to lie on the respective associated contact surface 6 at the limiting wall 5.

A schematic cross-section of an assembled arrangement in accordance with the invention with the reel 1 and the reinforcement element 20 in accordance with FIGS. 1a and 1b is shown in FIG. 1c, with the section, as is indicated in FIG. 1a by the line C, being made through the middle of the reel 1 and being viewed in the direction A.

In the middle cross-section of the reel 1 its axial cavity 3 and the thereto adjoining axial cut-out 4 can be recognised. In the region of the axial cavity 3 the shaft 12 has a round cross-section. The reinforcement element 20 is formed and inserted into the associated depressions 7, 8 of the reel 1 in such a manner that the upper side of its holder arms 22 substantially continues the round cross-section of the jacket surface 2 of the reel 1 along the cut-out 4.

A first part 31 of the belt band 30 forming the end of the belt band is folded back about the securing pin 21 at a transverse fold 32 and secured to a second part 33 through transverse sewings 34 in such a manner that the securing pin 21 is surrounded by a closed loop of the belt band 30 along its length which is limited by the two holder arms 22. In this the longitudinal edges 35 of the belt band 30 are folded over along the two parts 31, 33 in the direction towards the middle of the belt band and sewed to the belt band 30 so that each part 31, 33 has two belt band layers, of which in the cross-section through the middle of the belt band in accordance with FIG. 1c. in each case one layer can be recognised as a folded over longitudinal edge 35 and one layer can be recognised in section.

In a transition region 36 adjoining at the sewing 34 of the belt band the folded over longitudinal edge 35 of the belt band transforms into the non-folded state of straight-line cross-section so that the belt band 30 gradually assumes its full width along this region 36 (cf. also FIG. 2a). In this the transition region 36 of the longitudinal edge extends beyond the axial cut-out 4 up to the jacket surface 2 of the reel. There the inclined depressions 9, 24 at the jacket surface 2 and at the holder arms 22 respectively which are shown in FIG. 1a accommodate the longitudinal edges 35 which face them in a form-fitted manner.

The exact construction and the folding of the belt band 30 will be explained in more detail in connection with the FIGS. 2a to 2d.

The belt band 30, which surrounds the securing pin 21 with its loop, is led clockwise along a broad region of the jacket surface of the shaft 12 in the illustration in accordance with FIG. 1c and leaves the cavity 3 through the axial cut-out 4 in such a manner that it at first lies in contact with the transverse fold 32 of the loop and afterwards at the side of the jacket surface 2 of the reel 1 adjacent to the securing pin. In the non-illustrated further extent of the belt band 30 the latter can be wound again a plurality of times about the jacket surface 2 so that it lies on itself in a plurality of layers.

The reel 1 shown in FIGS. 1a, 1b and 1c and the reinforcement element 20 are provided for the rolling up of the belt band 30 along the jacket surface 2 of the reel. For this a roll-up mechanism, which is not illustrated in the figures, can effect the drive of the reel 1 to a rotational movement about a direction D, and a likewise non-illustrated holder mechanism can block an in particular abrupt rotational movement of the reel 1 counter to the direction D.

The reinforcement element 20 secured to the reel 1 serves on the one hand for the fixing of the belt band 30 or of its loop respectively via the securing pin 21 at the reel 1 so that the belt band 30 can be rolled up along the jacket surface 2 through a rotational movement which is transmitted via the shaft 12 to the reel 1.

On the other hand the reinforcement element 20 effects a mechanical stabilisation of the reel 1 in particular in the region of its axial cut-out 4 force components acting tangentially via the belt band 30 on the axial edge of the cut-out 4 are also taken over by that section of the reinforcement element 20 which lies on the opposite side of the axial cut-out 4 relative to the relevant edge so that a breaking apart or a tearing apart of the reel 1 at the cut-out 4 can effectively be prevented.

In the case that the belt band 30, as illustrated in FIG. 1c, is wound with a curvature which is always in the same direction about the shaft 12 and then about the jacket surface 2 and transmits a drawing force to the securing pin 21 in the direction E in this winding sense via the transverse fold 32, this force is also transmitted by the securing pin 21 via the holder arms 22 and their anchors 23 to the oppositely disposed region of the jacket surface 2 of the reel so that the force loading bridges the cut-out 4.

If on the contrary the belt band 30 is wound outside the reel cavity 3 or the cut-out 4 respectively in the direction F and is tensile stressed in this direction, tangential forces acting at the associated edge of the cut-out 4 can be transmitted via the anchors 23 and the holder arms 22 to the securing pin 21 at which the belt band 30, which is deflected about the shaft 12, acts in substantially the opposite direction.

The reinforcement element 20 thus serves not only for the securing of the belt band 30 to the reel 1, but it enables a transfer in particular of the tangential component of a force acting at one side of the cut-out 4 at the jacket surface 2 to the respective oppositely disposed side of the cut-out 4 for both possible force directions E, F.

FIG. 1d shows a further development of the reel in accordance with FIGS. 1a to 1c, and indeed in a cross-sectional view corresponding to the illustration in accordance with FIG. 1c. In the embodiment illustrated in FIG. 1d the same reference symbols designate in each case the same or similar parts as in FIGS. 1a to 1c.

In contrast to the above described reel, a counter-holding pin 40 is provided in this embodiment which extends parallel to the axis of the shaft 12, and indeed directly adjacent to and along the side of the shaft 12 which is oppositely disposed to the axial cut-out 4. The axial cut-out 4, the shaft 12 and the counter-holding pin 40 are thus substantially arranged one after the other along a straight line in the cross-sectional view in accordance with FIG. 1d. The belt band 30 is led from the securing pin 21 inside the right half of the axial cavity 3 in the illustration in accordance with FIG. 1d, about the section of the counter-holding pin 40 which points outwardly, and along the left half of the axial cavity 3 out of the axial cut-out 4.

At the side of the counter-holding pin 40 opposite to the shaft 12 the jacket surface 2 of the reel 1 has an axial opening 42. The section of the belt band 30 lying in contact with the counter-holding pin 40 is still located inside the outline of the inner limiting wall 5 in the radial direction relative to the shaft 12.

The counter-holding pin 40 is formed as a separate component and is anchored, latched or clamped at its two longitudinal ends in a manner not illustrated in FIG. 1d in contact surfaces which are formed on the inner limiting walls 5, in such a manner that it assumes a stable position in the event of a drawing force which is transmitted to it via the belt band 30 and which acts substantially in the direction of the shaft 12.

The arrangement shown in FIG. 1d serves for the rolling up of the belt band 30 along the jacket surface 2 of the reel 1 in the manner described in connection with the FIGS. 1a to 1c. Correspondingly the functions and advantages of the arrangement, in particular of the reinforcement element 20, which are described in that context also hold for the embodiment illustrated in FIG. 1d.

Since the belt band 30 is led out from the securing pin 21 in the direction towards the counter-holding pin 40, about the latter and out of the axial cut-out 4, the counter-holding pin 40, which is oppositely disposed to axial cut-out 4 and the securing pin 21 with respect to the shaft 12, also produces a relief of the shaft 12 from drawing forces or bending torques through the belt band 30 so that substantially only the torques required for the rolling up of the belt band 30 or the blocking of the reel 1 act on the shaft 12.

In order to sufficiently enlarge the axial cavity 3 for the reception of the counter-holding pin 40, it is also possible, instead of the formation of the jacket surface 2 with the axial opening 42, to merely make the wall thickness of the jacket surface 2 thinner at the corresponding location.

Furthermore, it is possible to form the counter-holding pin 40, at least along the section at which the belt band 30 lies in contact, with two wings which each point in the direction towards the axial cut-out 4 and which at least partly surround the shaft 12 without contact so that a lying of the belt band 30 in contact with the shaft 12 and thus an impeding of a rotational movement of the shaft 12 or a rubbing open of the belt band 30 is prevented.

For the more detailed explanation of the folding and sewing of the belt band 30 illustrated in FIGS. 1c and 1d the belt band 30 is shown in FIGS. 2a, 2b, 2c and 2d in the non-assembled, extended state. The two longitudinal edges 35 of the belt band 30 are each folded over at its end region along a longitudinal fold 37 in the direction towards the middle of the belt band and sewed to the remaining, not folded over section of the respective belt band half by a longitudinal seam 38. Along this longitudinal fold region the belt band 30 thus takes on only about one half of its original width, and the outer edge of the longitudinally folded belt band 30 is formed by the respective longitudinal fold 37.

A first part 31 of the belt band 30 forming the end of the belt band is folded back at a transverse fold 32 in the direction towards an adjacent second part 33 and sewed to the latter by a transverse seam 34. In this the transverse seam 34 ends at both parts substantially at the respective end of the longitudinal seam 38. The two belt band parts 31, 33 and their transverse seam 34 thus form a closed loop. In this the first part 31 is folded over onto the second part 32 in such a manner that the longitudinal edges 35 of the belt band which are folded over in the direction towards the middle of the belt band come to lie on the outer side of the loop, or the middle region of the belt band forms the inner side of the loop respectively.

At the transverse seam 34 and thus at the end of the longitudinal seam 38 there adjoins, as can be particularly clearly recognised in the plan view in accordance with FIG. 2a, a transition region 36 in which the longitudinal edges 35, which are folded over in the direction towards the middle of the belt band, return to their straightly directed position, so that the belt band 30 has a flat cross-section at the end of this region 36. In this there results a slight raising in the extent of the longitudinal edge 35 in the relaxed state of the belt band 30, as can be particularly clearly recognised in the partially cut away side view in accordance with FIG. 2b.

Through the embodiment in accordance with the invention of the belt band 30 shown in FIGS. 2a to 2d the loop formed at the end of the belt band has a width which is substantially less than the width of the remaining belt band. In the arrangement in accordance with the invention and as is shown in FIGS. 1a to 1c and in FIG. 1d, as well as in other uses of a belt band suspension, a more compact construction of the apparatus which is surrounded by the belt band loop and in particular a reduced length of the securing pin 21 are thereby possible.

List of Reference Numerals 1 reel
2 jacket surface
3 axial cavity
4 axial cut-out
5 inner limiting wall
6 contact surface
7 depression
8 t-shaped depression
9 inclined depression
10 limiting disc
11 central cut-out
12 shaft
20 reinforcement element 21 securing pin
22 holder arm
23 anchor
24 inclined depression
30 belt band
31 first belt band part
32 transverse fold
33 second belt band part
34 transverse seam
35 longitudinal edge
36 transition region
37 longitudinal fold
38 longitudinal seam
40 counter-holding pin
42 axial opening

What is claimed is:

1. An arrangement for the rolling up of a belt band comprising:
    a reel, which has an axial cut-out extending parallel to the reel axis at its jacket surface;
    a belt band secured at the reel; and
    a reinforcement element which is arranged at the reel and which bridges the axial cut-out,
    wherein the reinforcement element has a securing pin extending transversely to a belt band direction and a holder for securing the securing pin at the reel, and
    wherein the reel has a receptor in which the holder is adapted to be secured.

2. Arrangement in accordance with claim 1, wherein the reinforcement element is formed as a separate component.

3. Arrangement in accordance with claim 1, wherein the reinforcement element and the reel are formed in such a manner that the reinforcement element can be at least partly sunk in the reel.

4. Arrangement in accordance with claim 1, wherein the belt band is secured to the reinforcement element, with the belt band having a closed loop at its end within which at least a part of the reinforcement element is arranged.

5. Arrangement in accordance with claim 1, wherein the belt band is guided about at least a part of the peripheral surface of a shaft and/or along a part of the peripheral surface of a shaft, with the shaft being arranged coaxial to the reel axis inside an axial cavity of the reel and with the belt band being led out of the reel through the axial cut-out.

6. Arrangement in accordance with claim 1, wherein the securing pin and the holder are provided for the arrangement at substantially mutually oppositely disposed sides of the axial cut-out of the reel.

7. Arrangement in accordance with claim 1, wherein the holder has at least one substantially elongated holder arm which is arranged at a longitudinal end of the securing pin.

8. Arrangement in accordance with claim 7, wherein a holder arm extends at least region-wise in a curved manner, with the curvature corresponding to the radius of a cross-section of the reel.

9. Arrangement in accordance with claim 7, wherein one end of the holder arm is formed as a hook latch which is adapted to be secured, by hooking in or latching, in the reel.

10. Arrangement in accordance with claim 9, wherein the hook latch is formed as a T-shaped anchor of which both barbs are directed at least substantially parallel to the reel axis; and in that the reel has as a receptor for each T-shaped anchor a recess associated with the latter.

11. Arrangement for the rolling up of a belt band comprising:
    a cylindrical reel with an axial cut-out extending parallel to the reel axis at its jacket surface;
    a belt band secured at the reel;
    a reinforcement element which is arranged at the reel and which bridges the axial cut-out; and
    an elongated counter-holding pin which is arranged substantially parallel to the reel axis inside the jacket surface of the reel, with the pin being substantially oppositely disposed to the axial cut-out of the jacket surface with respect to the reel axis.

12. Arrangement in accordance with claim 11, wherein the counter-holding pin is formed as a separate component.

13. Arrangement in accordance with claim 11, wherein the counter-holding pin is formed with at least one longitudinal end at an outer limiting disc of the reel.

14. Arrangement in accordance with claim 11 characterised in that the reel has at its jacket surface and/or at least one outer limiting disc a contact surface on which the counter-holding pin is supported and which is formed at a step offset radially inwardly displaced relative to the jacket surface of the reel.

15. Arrangement in accordance with claim 11, wherein the belt band is guided along a section of the counter-holding pin extending parallel to the reel axis and/or about the counter-holding pin, with this section in particular pointing away from the reel axis.

16. Arrangement in accordance with claim 11, wherein the reel has at its jacket surface an axial opening which in particular is formed in a radial extension of the counter-holding pin with respect to the reel axis and/or is substantially oppositely disposed to the axial cut-out with respect to the reel axis.

17. Arrangement for the rolling up of a belt band comprising:
    a cylindrical reel with an axial cut-out extending parallel to the reel axis at its jacket surface;
    a belt band secured at the reel;
    a reinforcement element which is arranged at the reel and which bridges the axial cut-out; and
    wherein the extension of an axial cut-out and/or of an axial opening of the reel in a direction parallel to the reel axis is less than the width of an unfolded belt band.

* * * * *